United States Patent
Lee et al.

[15] 3,668,323
[45] June 6, 1972

[54] AUTOMOTIVE VEHICLE SOUND DISTRIBUTION SYSTEM

[72] Inventors: Thomas H. Lee, 2400 South Wabash; Donald E. Brinkerhoff, 3020 Dellwood Drive, both of Kokomo, Ind. 46901

[22] Filed: Oct. 19, 1970

[21] Appl. No.: 81,714

[52] U.S. Cl..............................................179/1 VE
[51] Int. Cl..............................................H04r 5/02
[58] Field of Search....................179/1 VL, 1 VE, 6 A

[56] References Cited

UNITED STATES PATENTS

| | | |
|---|---|---|
| 3,300,583 | 1/1967 | Mikelevcius..................179/1 VE |
| 2,521,129 | 9/1950 | Sampson et al..................179/1 VE |
| 3,397,286 | 8/1968 | Prewitt et al. ..................179/1 VE |

Primary Examiner—Kathleen H. Claffy
Assistant Examiner—Horst F. Brauner
Attorney—E. W. Christen, C. R. Meland and Tim G. Jagodzinski

[57] ABSTRACT

In an automotive vehicle, a relay is manually operable to shift control over the sound level of a rear seat speaker from a front seat fader exclusively to a rear seat fader and the front seat fader collectively.

2 Claims, 1 Drawing Figure

PATENTED JUN 6 1972 3,668,323
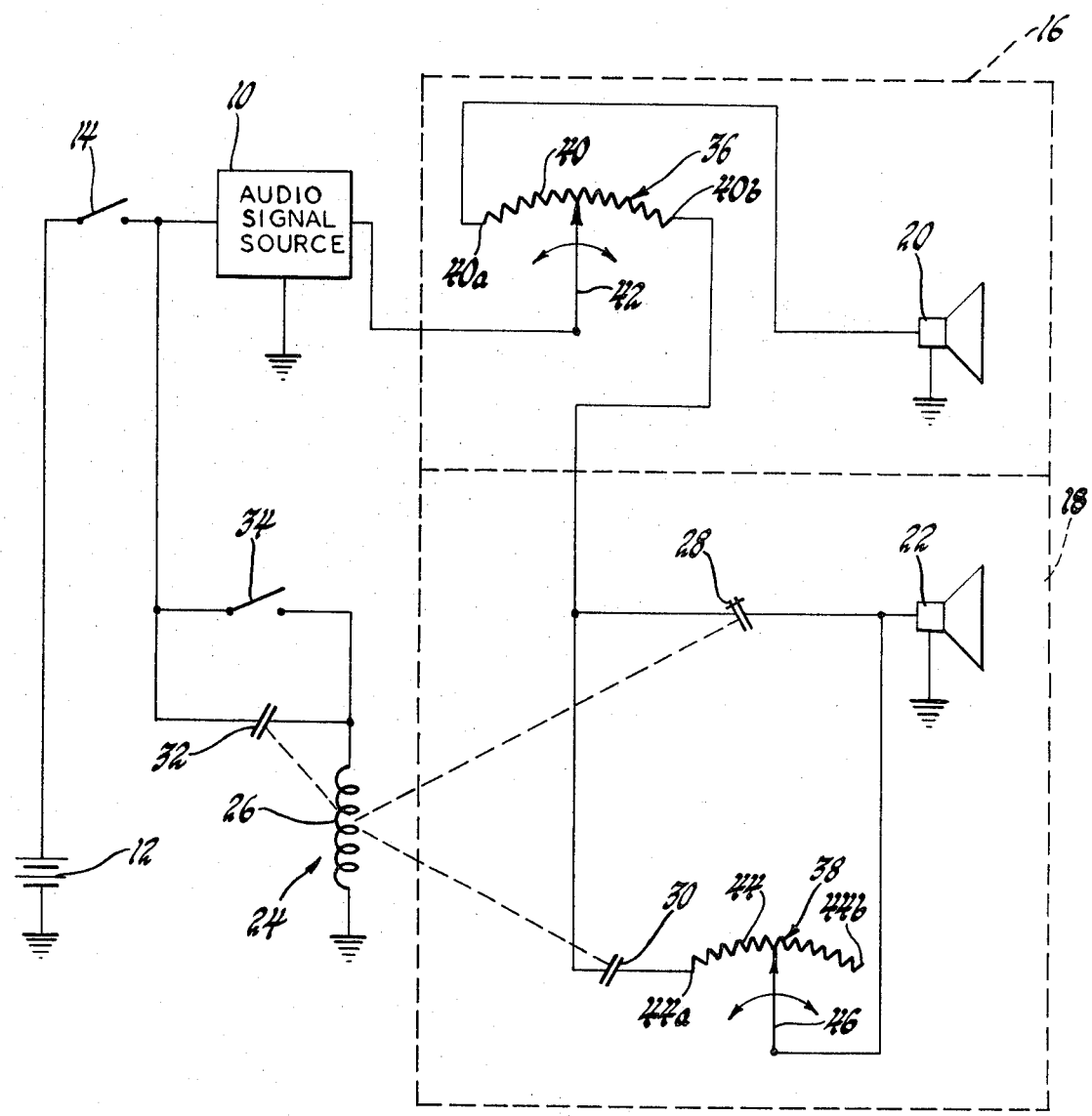
INVENTORS
Thomas H. Lee &
BY Donald E. Brinkerhoff
Jim G. Jagodzinski
ATTORNEY

AUTOMOTIVE VEHICLE SOUND DISTRIBUTION SYSTEM

This invention relates to a sound entertainment system for an automotive vehicle. More particularly, the invention relates to an automotive vehicle sound distribution system including a front seat speaker for servicing a front seat passenger area and a rear seat speaker for servicing a rear seat passenger area.

According to one aspect of the invention, control over the sound level of the front seat speaker resides with a front seat fader exclusively while control over the sound level of the rear seat speaker is selectively transferable from the front seat fader exclusively to a rear seat fader and the front seat fader collectively.

In another aspect of the invention, a rear seat fader is connected in tandem with the front seat fader so that the rear seat fader may lower the sound level of the rear seat speaker below the sound level defined by the front seat fader but may not raise the sound level of the rear seat speaker above the sound level defined by the front seat fader.

As contemplated by a further aspect of the invention, a relay connects the rear seat speaker to the front seat fader directly when the relay is manually deenergized from the front seat passenger area and connects the rear seat speaker to the front seat fader indirectly through the rear seat fader when the relay is manually energized from the rear seat passenger area.

These and other aspects and advantages of the invention will become more apparent by reference to the following detailed description of a preferred embodiment when considered in conjunction with the accompanying drawing in which the sole FIGURE is a schematic diagram of an automotive vehicle sound entertainment system incorporating the principles of the invention.

Referring to the drawing, a sound entertainment system for an automotive vehicle includes an audio signal source 10 which may take the form of a radio receiver, a tape player, a phonograph player or any other appropriate audio signal generator. The audio signal source 10 is connected to a power supply 12 through an audio control switch 14. Conveniently the power supply 12 may be provided by the vehicle battery.

The automotive vehicle includes a front seat passenger area 16 and a rear seat passenger area 18. A first or front seat speaker 20 services the front seat passenger area 16. A second or rear seat speaker 22 services the rear seat passenger area 18. That is, the first and second speakers 20 and 22 convert audio electrical signals received from the audio signal source 10 into audible acoustical signals which are projected into the front and rear seat passenger areas 16 and 18, respectively. The overall sound level of the first and second speakers 20 and 22 is regulated in a manner which will now be described.

A switching device or control relay 24 includes a coil 26 which operates a first or normally closed set of switching contacts 28, a second or normally open set of switching contacts 30 and a third or normally open set of holding contacts 32. The coil 26 is connected to the power supply 12 through a relay control switch 34 and through the audio control switch 14. The normally open set of holding contacts 32 is connected across the relay control switch 34.

A first or front seat fader 36 is connected between the audio signal source 10 and the front seat speaker 20. In addition, the front seat fader 36 is connected between the audio signal source 10 and the rear seat speaker 22 through the first set of switching contacts 28. A second or rear seat fader 38 is connected between the front seat fader 36 and the rear seat speaker 22 through the second set of switching contacts 30. The overall sound level of the first and second speakers 20 and 22 is determined by the variable resistance provided by the first and second faders 36 and 38.

More specifically, the front seat fader 36 includes a resistive winding 40 and a control wiper 42 movable over the winding 40 between a first end $40_a$ and a second end $40_b$. The first end $40_a$ of the winding 40 is connected to the front seat speaker 20. The second end $40_b$ of the winding 40 is connected through the first set of switching contacts 28 to the rear seat speaker 22. The wiper 42 is connected to the audio signal source 10. Similarly, the rear seat fader 38 includes a resistive winding 44 and a control wiper 46 movable over the winding 44 between a first end $44_a$ and a second end $44_b$. The first end $44_a$ of the winding 44 is connected through the second set of switching contacts 30 to the second end $40_b$ of the first winding 40. The second end $44_b$ of the winding 44 is unconnected. The wiper 46 is connected to the rear seat speaker 22.

In operation, the audio signal source 10 is energized from the power supply 12 to produce audio electrical signals when the audio control switch 14 is closed. The front seat fader 36 is manually operable from the front seat passenger area 16 to exclusively control the overall sound level of the front seat speaker 20. Normally, the relay control switch 34 is opened so that the coil 26 is deenergized to place the relay 24 in a deactuated or deenergized condition. In the deactuated condition, the first set of switching contacts 28 is closed and the second set of switching contacts 30 is opened. As a result, the front seat fader 36 also exclusively regulates the overall sound level of the rear seat speaker 22 through the first set of switching contacts 28.

In particular, as the wiper 42 is moved toward the first end $40_a$ of the winding 40, the resistance effectively connected between the audio signal source 10 and the front seat speaker 20 decreases while the resistance effectively connected between the audio signal source 10 and the rear seat speaker 22 increases. Accordingly, the overall sound level of the front seat speaker 20 is raised and the overall sound level of the rear seat speaker 22 is lowered. Conversely, as the wiper 42 is moved toward the second end $40_b$ of the winding 40, the resistance effectively connected between the audio signal source 10 and the front seat speaker 20 increases while the resistance effectively connected between the audio signal source 10 and the rear seat speaker 22 decreases. Consequently, the overall sound level of the front seat speaker 20 is lowered and the overall sound level of the rear seat speaker 22 is raised. Thus, when the relay 24 is in the deactuated condition, the overall sound level of the first and second speakers 20 and 22 may be regulated in inverse relationship by the front seat fader 36.

When the relay control switch 34 is closed, the coil 26 is energized to place the relay 24 in the actuated or energized condition. In the actuated condition, the first set of switching contacts 28 is opened and the second set of switching contacts 30 is closed. As a result, the rear seat fader 38 is effectively connected between the front seat fader 36 and the rear seat speaker 22 through the second set of switching contacts 30. The rear seat fader 38 is manually operable from the rear seat passenger area 18 to collectively regulate the overall sound level of the rear seat speaker 22 in conjunction with the front seat fader 36.

Specifically, as the wiper 46 is moved toward the first end $44_a$ of the winding 44, the resistance effectively connected between the audio signal source 10 and the rear seat speaker 22 decreases. Accordingly, the overall sound level of the rear seat speaker 22 is raised. Conversely, as the wiper 46 is moved toward the second end $44_b$ of the winding 44, the resistance effectively connected between the audio signal source 10 and the rear seat speaker 22 increases. Consequently, the overall sound level of the rear seat speaker 22 is lowered. Hence, when the relay 24 is in the actuated condition, the overall sound level of the second speaker 22 may be regulated by the rear seat fader 38.

It will be noted that the rear seat fader 38 can increase the total resistance effectively connected between the audio signal source 10 and the rear seat speaker 22 above the resistance provided by the front seat fader 36. However, the rear seat fader 38 cannot decrease the total resistance effectively connected between the audio signal source 10 and the rear seat speaker 22 below the resistance provided by the front seat fader 36. Therefore, the rear seat fader 38 may be utilized to lower the overall sound level of the rear seat speaker 22 below the sound level defined by the front seat fader 36, but the rear seat fader 38 may not be utilized to raise the overall sound level of the rear seat speaker 22 above the sound level defined by the front seat fader 36.

Further, when the coil 26 is energized to place the relay 24 in the actuated condition, the third set of holding contacts 32 is closed. As a result, the coil 36 remains energized through the third set of holding contacts 32 even though the relay control switch 34 is subsequently opened. Preferably, the relay control switch 34 is manually operable from the rear seat passenger area 18. The rear seat fader 38 may be overridden by opening the audio control switch 14 thereby deenergizing the coil 26 to place the relay 24 in the deactuated condition. Of course, with the audio control switch 14 opened, the audio signal source 10 is also deenergized. Preferably, the audio control switch 14 is manually operable from the front seat passenger area 16. Therefore, primary control over the illustrated automotive vehicle sound entertainment system resides with the vehicle operator in the front seat passenger area 16.

It is to be understood that the previously described preferred embodiment of the invention is shown for illustrative purposes only and that various alterations and modifications may be made to it without departing from the spirit and scope of the invention. Thus, the inventive automotive vehicle sound distribution system is not limited to a two speaker monophonic system, but may be readily adapted to a four or more speaker stereophonic system by appropriately duplicating the illustrated control circuitry.

I claim:

1. In an automotive vehicle having a front seat passenger area and a rear seat passenger area, a sound distribution system, comprising: an audio signal source; a first speaker servicing the front seat passenger area; a second speaker servicing the rear seat passenger area; switching means manually operable between a deactuated condition and an actuated condition, the switching means having first and second sets of switching contacts, the first set of contacts closed in the deactuated condition and open in the actuated condition, the second set of contacts open in the deactuated condition and closed in the actuated condition; a first fader connected between the audio signal source and the first speaker and connected between the audio signal source and the second speaker through the first set of contacts which are connected between the first fader and the second speaker, the first fader manually operable from the front seat passenger area to exclusively regulate the sound level of the first speaker at all times and to exclusively regulate the sound level of the second speaker when the switching means is in the deactuated condition; and a second fader connected between the first fader and the second speaker through the second set of contacts, the second fader manually operable from the rear seat passenger area to collectively regulate the sound level of the second speaker in conjunction with the first fader when the switching means is in the actuated condition.

2. In an automotive vehicle having a front seat passenger area and a rear seat passenger area, a sound distribution system, comprising: an audio signal source; a first speaker servicing the front seat passenger area; a second speaker servicing the rear seat passenger area; relay means switchable between a deenergized condition and an energized condition, the relay means having first and second sets of switching contacts, the first set of contacts closed in the deenergized condition and open in the energized condition, the second set of contacts open in the deenergized condition and closed in the energized condition; a first fader connected between the audio signal source and the first speaker directly and connected between the audio signal source and the second speaker through the first set of contacts which are connected between the first fader and the second speaker, the first fader manually operable from the front seat passenger area to exclusively regulate the sound level of the first speaker at all times and to exclusively regulate the sound level of the second speaker when the first set of contacts is closed in the deenergized condition of the relay means; a second fader connected between the first fader and the second speaker through the second set of contacts, the second fader manually operable from the rear seat passenger area to collectively regulate the sound level of the second speaker in conjunction with the first fader when the second set of contacts is closed in the energized condition of the relay means; first control means connected to the relay means and operable from the front seat passenger area to deenergize the relay means; and second control means connected to the relay means and operable from the rear seat passenger area to energize the relay means.

* * * * *